Dec. 6, 1966  C. W. WEEDFALL  3,289,487
POWER DRIVE PULLEY

Filed July 15, 1964  2 Sheets-Sheet 1

INVENTOR.
CLARENCE W. WEEDFALL
BY
M. A. Hobbs
ATTORNEY

Dec. 6, 1966  C. W. WEEDFALL  3,289,487
POWER DRIVE PULLEY

Filed July 15, 1964  2 Sheets-Sheet 2

INVENTOR.
CLARENCE W. WEEDFALL
BY
M. A. Hobbs
ATTORNEY

United States Patent Office 3,289,487
Patented Dec. 6, 1966

3,289,487
POWER DRIVE PULLEY
Clarence W. Weedfall, 2520 Willa Drive,
St. Joseph, Mich.
Filed July 15, 1964, Ser. No. 382,813
9 Claims. (Cl. 74—214)

The present invention relates to a power drive pulley or wheel, and more particularly to a power drive and transmission mechanism for a phonograph turntable.

In conventional phonographs, the turntable is usually driven by a transmission mechanism having an idler wheel driven by frictional engagement with the motor pulley or wheel. The idler wheel in turn frictionally engages the internal side of the flange or rim of the turntable, and hence transmits power from the motor at a substantially reduced rate of rotation to the turntable. The motor is usually suspended by rubber grommets to absorb motion vibrations and prevent a portion of the vibrations from reaching the base plate of the record changer. The grommets also act as a flexible reaction for the pressure produced through the idler wheel contacts or pressure angle. The conventional idler wheels have a number of inherent disadvantages which often render them unsatisfactory, including transmission of motor vibration to the turntable, slippage between the motor and idler wheels and/or between the idler wheel and turntable, the occurrence of excessive wear, and scuffing and glazing of the peripheral surface, requiring frequent replacement of the wheels to obtain or maintain acceptable performance in the operation of the phonograph. It is therefore one of the principal objects of the present invention to provide an idle pulley or wheel in a power transmission mechanism for a phonograph, which is so constructed that vibrations created directly and indirectly by the motor as well as vibrations generated from other moving parts are effectively dampened by the idler wheel, yet which provides an effective and positive drive relation between the idler wheel and the motor pulley and turntable.

Another object of the invention is to provide a relatively simple, long-wearing phonograph idler wheel of a composite construction, which utilizes one type of resilient material shaped to provide flexibility and having absorption qualities for effective vibration dampening in combination with another type of resilient material for effective frictional drive relationship between the idler wheel and motor pulley and turntable, and in which these resilient materials are mounted on and supported by an effective wear-resistant bearing and hub construction.

Still another object of the invention is to provide an easily installed, self-aligning phonograph idler wheel having a rigid backing to the entire peripheral surface to maintain diametrical stability, which prevents sound distortions known as "wow" and "flutter" and excessive wear of the wheel's peripheral surface due to excessive deflection generated by the motor pulley during the heavy load cycle of the changer mechanism operation.

Another object is to provide an idler wheel of the aforesaid type which absorbs vibration transmitted by the idle arm, idle arm shaft, shift mechanism, and all other parts which vibrate as a result of the magnetic field produced by an induction type electric motor, and which dampens vibrations that result from various harmonics and distortion which produce what is known as "rumble" in sound reproduction of lower bass notes.

Another object of the invention is to provide a flexible central mounting of the bearing for the idler wheel through which a light initial spring pressure can be applied to engage it with the motor pulley and inside rim of the turntable, and also to permit disengagement when the phonograph is shut off. It is common practice to use an included angle of approximately 114°, as shown in FIGURE 1, which automatically builds up driving pressure as resistance and force required increase. The eccentricity between I.D. and O.D. of the idler is compensated for by the action of the idler arm linkage. Eccentricity in common practice has bene specified at .001 total indicator reading.

Another object of the invention is to provide a flexible absorption means between the hub and rigid annular member to enable deflections to occur in line with the bearing center line, as well as at right angles to it, in order to arrest detrimental vibrations to sound reproduction from traveling from the base plate and shift mechanism to the turntable.

Another object of the invention is to provide a phonograph idler wheel which can be readily fabricated using standard production methods, and which is so constructed and arranged that it does not require special care or close tolerances in its manufacture.

Additional objects and advantages of the present invention will become apparent from the following description and accompanying drawings, wherein.

Figure 1:
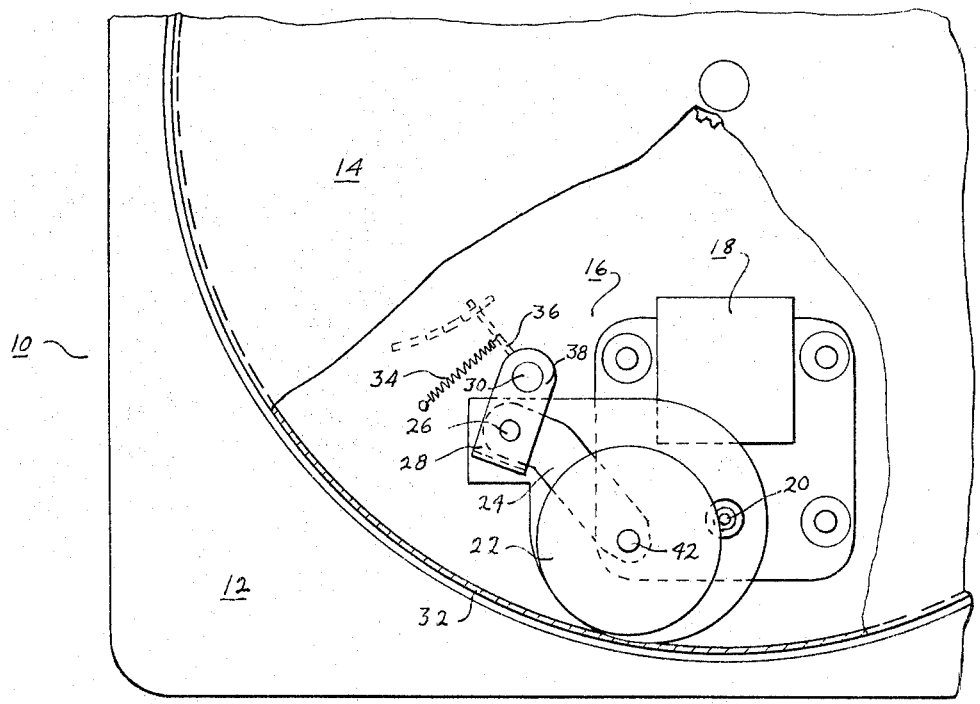
FIGURE 1 is a fragmentary view of a phonograph turntable showing a portion broken away for the purpose of illustrating the phonograph drive mechanism in plan view, with the present idler wheel in operating position.
Figure 2:
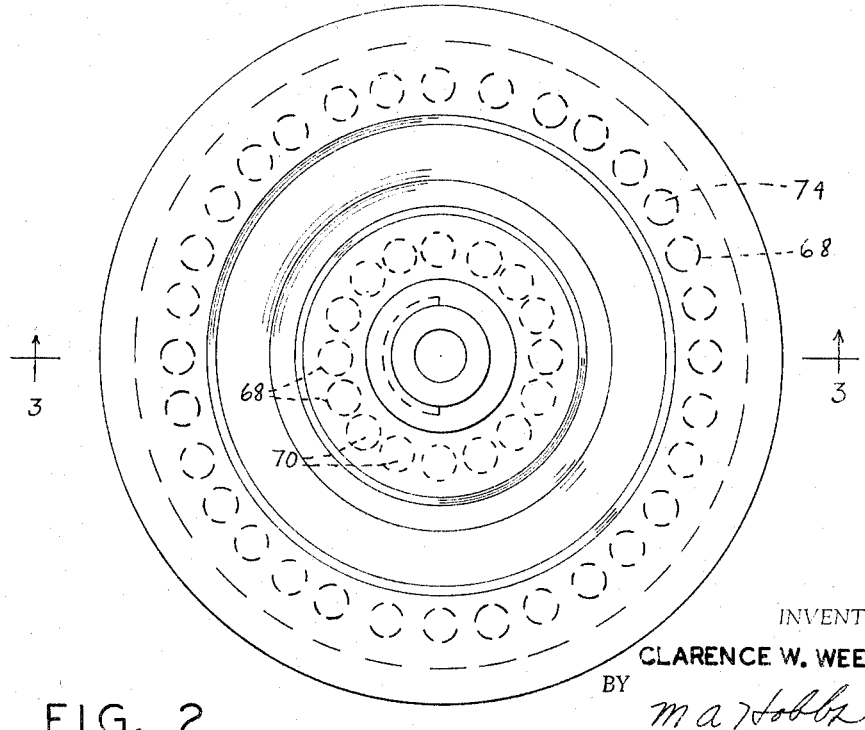
FIGURE 2 is an enlarged top plan view of the present idler wheel, the construction of which is partially shown in broken lines.

Referring more specifically to the drawings, and to FIGURE 1 in particular, numeral 10 designates generally a phonograph record changer mechanism having a base 12, and a turntable 14 mounted on base 12 and driven by any suitable operating mechanism, and numeral 16 designates the power drive and transmission mechanism for the turntable. The drive consists of an electric motor 18 of the induction type having a drive pulley 20 for driving the present idler wheel 22. The idler wheel is mounted on an idle arm 24 pivotally supported by a pin 26 on fixture 28, the fixture being pivotally supported on the base plate 12 by shaft 30. The idler wheel 22 engages the inner surface of rim 32 of turntable 14 and is held in driving engagement therewith by a coil spring 34 secured at one end to lever 36 which is connected to the idle arm by lever 38. The idler wheel rotates in the clockwise direction, as viewed in FIGURE 1, and is driven by direct engagement of pulley 20 with the peripheral surface of the idler wheel which in turn peripherally engages the internal surface of rim 32 for frictionally driving the turntable.

Figure 3:
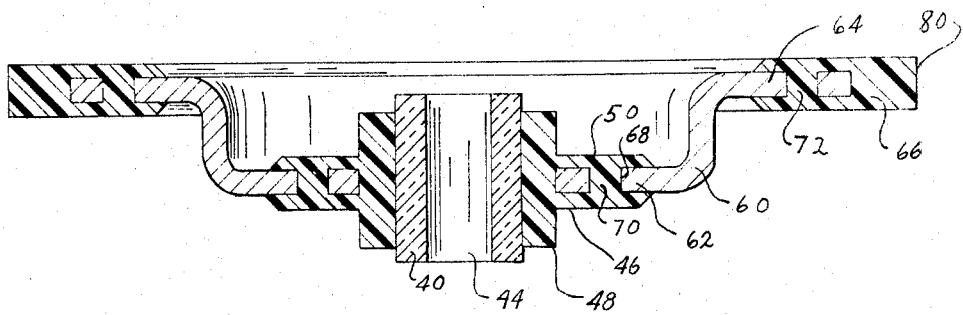
FIGURE 3 is a vertical cross sectional view through the wheel shown in FIGURE 2 illustrating one embodiment of the present invention, the section being taken on line 3—3 of FIGURE 2.
Figure 4:
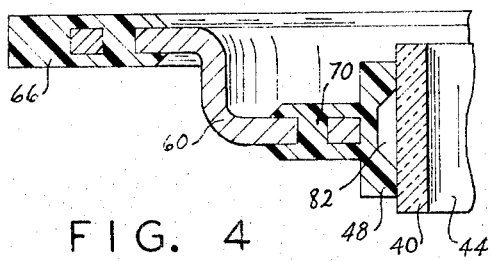
FIGURE 4 is a fragmentary view of the present wheel showing a construction similar to that shown in FIGURE 3, but illustrating a modification thereof.

The present invention is directed primarily to the construction of idler wheel 22, various forms of which are illustrated in FIGURES 2 through 6, all of the idler wheels embodying a basic concept for providing effective dampening of vibrations, improved wearing quality and stability of driving surface, combined with optimum frictional engagement between its periphery and the motor pulley 20 and turntable flange 32. The embodiment of the present invention illustrated in FIGURES 2 and 3 consists of a hub or bearing 40 for receiving a shaft or pin 42 in bore 44, the hub being constructed of any long wearing suitable, anti-friction material. Mounted on the hub is a first resilient disc-shaped member 46 having a cylindrical portion 48 secured to the external surface of hub 40 and an annular portion 50 joined integrally to cylindrical portion 48. The disc-shaped portion 46 is formed of resilient rubber or rubber-like material having excellent vibration-dampening characteristics, and for this purpose a neoprene material of 20 to 25 durometers has been found to be particularly satisfactory. A rigid annular member 60, preferably constructed of metal having non-magnetic qualities, has an inner flange 62 and an outer flange 64 joined to an annular member 66. The inner flange is provided with a series of holes 68 which receive the resilient material 70 as the disc-shaped member 46 is molded onto the inner flange 62, thus giving a strong physical bond between members 46 and 60. The outer flange 64 of member 60 firmly supports annular member 66 which is molded and bonded onto rim 64 and secured thereto by the material 72 of member 66 extending through a series of holes 74 in flange 64, thus forming a secure physical bond between flange 64 and annular member 66. The peripheral surface 80 of member 66 forms the frictional engaging surface between the motor pulley 20 and the idler wheel, and between the idler wheel and the internal surface of turntable flange 32. The composition of annular member 66 is preferably of neoprene material of 60 to 65 durometers, although various combinations between the inner disc-shaped member 46 and outer annular member 80 may be used to satisfy requirements. In order to obtain optimum vibration dampening characteristics in disc-shaped member 46, an inner groove 82 is preferably provided on the inner surface of cylindrical member 48, as illustrated in FIGURE 4.

Figure 5:
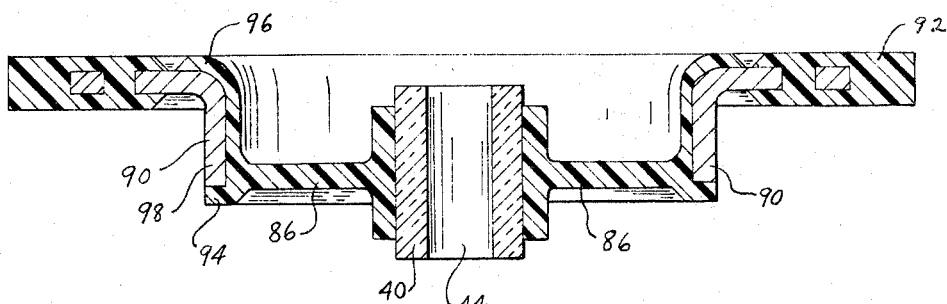
FIGURE 5 is a vertical cross sectional view of the present wheel showing a further modified form thereof, the section being taken on the same line as FIGURE 3.

FIGURE 5 illustrates a modified form of the present invention embodying the basic concept disclosed in FIGURE 3, i.e. a wheel having a vibration dampening member 86 secured to the external surface of hub 40 and supporting an annular member 90, which in turn supports a resilient annular member 92. The principal difference between the modified form shown in FIGURE 5 and that shown in FIGURE 3 is the manner in which the inner annular member 86 is secured to the rigid annular member 90. In this modified form, the rigid member is of L-shaped cross section and is connected to member 86 by two radially extending flange portions 94 and 96, and no holes are provided in the inner portion of member 90, i.e., the axial portion 98 of rigid member 90, for securing members 86 and 90 together. The outer annular member 92 is preferably of the same construction and composition as the annular member 66 shown in FIGURE 3.

Figure 6:
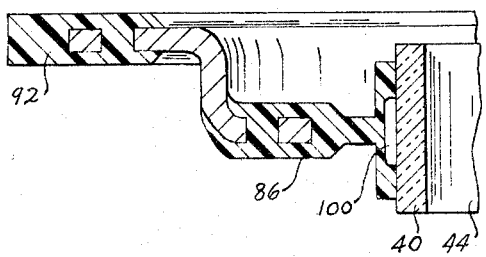
FIGURE 6 is a fragmentary cross sectional view of a wheel similar to that shown in FIGURE 5, illustrating a further modified form of the present invention.

FIGURE 6 illustrates a further modified form of the present invention in which an internal annular groove 100 is provided on the internal side of annular member 86 in order to improve the vibration dampening characteristics of this member. The construction of the wheel shown in FIGURE 6 is otherwise the same as that shown in FIGURE 5.

In fabricating the present wheel, the hub and rigid members 60 and 90 are formed preferably by a stamping or a machining operation and are then placed in a mold for receiving the two different compositions of the resilient material. The two kinds of resilient material may be molded in separate operations, i.e. first molding either the inner annular member 46 or 86 and then molding the outer annular member 66 or 92 in a separate and independent operation, or it is possible to mold both the inner and outer members in the same molding operation. The hub can be inserted after the molding operation and held in place by the tension of the rubber around it. Additional bonding can be obtained with the application of glue between the bearing O.D. and I.D. of the molded part. This must be done when undercut is used. Since the inner annular members 46 and 86 are more resilient and flexible than the outer annular members 66 and 92, most of the vibration dampening occurs in the members 46 and 86. The outer annular members 66 and 92 are of a firmer material and hence resist wear, and excessive deflection at the motor pulley, and yet give a good frictional engagement between the idler wheel 22 and motor pulley 20, and between the idler wheel and the internal side of flange 32.

While several modifications of the present invention have been described in detail herein, further changes and modifications may be made without departing from the scope of the present invention.

I claim:

1. An idler wheel for phonograph turntables, comprising a cylindrical hub having a bore therethrough, an inner annular member of neoprene of a durometer between 20 and 25 mounted on and extending radially from said hub, said member having a cylindrical portion with an annular groove on the inner side adjacent said hub, a rigid annular member having inner and outer radial flanges in off-set relation, each flange having a plurality of holes, and an outer annular member secured to the outer flange of said rigid member and being constructed of relatively firm and wear resistant neoprene material of a durometer between 60 and 65, said inner and outer resilient annular members overlapping the respective edges of said rigid member and embracing said holes.

2. An idler wheel for phonograph turntables, comprising a cylindrical hub having a bore therethrough, an inner annular member of neoprene of a durometer between 20 and 25 mounted on and extending radially from said hub, a relatively rigid annular member having inner and outer radial flanges in off-set relation, each flange having a plurality of holes, and an outer annular member secured to the outer flange of said rigid member and being constructed of relatively firm and wear resistant neoprene material of a durometer between 60 and 65, said inner and outer resilient annular members overlapping the respective edges of said rigid member and embracing said holes.

3. An idler wheel for phonograph turntables, comprising a cylindrical hub having a bore therethrough, an inner annular member of neoprene of a durometer between 20 and 25 mounted on and extending radially from said hub, a relatively rigid annular member having inner and outer radial flanges, and an outer annular member secured to the outer flange of said rigid member and being constructed of relatively firm and wear resistant neoprene material of a durometer between 60 and 65, said inner and outer resilient annular members overlapping the respective edges of said rigid member.

4. An idler wheel for phonograph turntables, comprising a cylindrical hub having a bore therethrough, an inner annular member of resilient material mounted on and extending radially from said hub, said member having a cylindrical portion with an annular groove on the inner side adjacent said hub, a relatively rigid annular member having inner and outer radial flanges in off-set relation, each flange having a plurality of holes, and an outer annular member secured to the outer flange of said rigid member and being constructed of relatively firm and wear resistant resilient material, said inner and outer resilient annular members overlapping the respective edges of said rigid member and embracing said holes.

5. An idler wheel for phonograph turntables, comprising a hub having a bore therethrough, an inner annular member of vibration dampening material mounted on and extending radially from said hub, a relatively rigid annular member having inner and outer radial flanges, said inner flange being secured to said inner annular member, and an outer annular member secured to the outer flange of said rigid member and being constructed of relatively firm and wear resistant material.

6. An idler wheel for phonograph turntables, comprising a hub constructed of relatively rigid wear resistant material and having a bore therethrough, an inner annular member of resilient material mounted on and extending radially from a portion of said hub, a relatively rigid annular member secured at its inner edge to said inner annular member, and an outer annular member secured to the outer edge of said rigid member and being constructed of relatively firm and wear resistant resilient material, said inner and outer members being firmly connected to the respective edges of said relatively rigid annular member.

7. An idler wheel for phonograph turntables, comprising a hub, an inner annular member of resilient material mounted on and extending radially from said hub, a relatively rigid annular member having inner and outer radial flanges, and an outer annular member secured to the outer flange of said rigid member and being constructed of relatively firm and wear resistant resilient material, said inner and outer resilient annular members overlapping the respective edges of said rigid member.

8. An idler wheel for phonograph turntables, comprising a hub of relatively rigid wear resistant material, an inner annular member of vibration dampening material mounted on and extending radially from a portion of said hub, a relatively rigid annular reinforcing backing member secured at its inner edge to said inner annular member, and an outer annular member secured to the outer edge of said rigid member and being constructed of relatively firm and wear resistant resilient material, said inner and outer members being firmly connected to the respective edges of said relatively rigid annular member.

9. A power drive wheel, comprising a rotatable center support member of relatively rigid wear resistant material, an inner annular member of resilient material mounted on and extending radially from a portion of said support member, a relatively rigid annular member, secured at its inner edge to said inner annular member, and an outer annular member secured to the outer edge of said rigid member and being constructed of relatively firm and wear resistant resilient material, said inner and outer members being firmly connected to the respective edges of said relatively rigid annular member.

References Cited by the Examiner

UNITED STATES PATENTS

| | | | |
|---|---|---|---|
| 2,671,488 | 3/1954 | Christensen | 64—27 X |
| 2,828,616 | 4/1958 | Zeigler et al. | 64—11 X |
| 2,869,388 | 1/1959 | Kreis | 64—11 X |
| 2,872,225 | 2/1959 | Walker | 64—11 X |
| 2,915,907 | 12/1959 | Giskes | 74—216 |
| 2,955,481 | 10/1960 | Jackel | 74—443 X |
| 3,076,352 | 2/1963 | Larsh | 74—443 |
| 3,126,760 | 3/1964 | Pierce | 74—443 X |
| 3,133,449 | 5/1964 | Antwerp et al. | 74—216 |

DAVID J. WILLIAMOWSKY, *Primary Examiner.*

J. A. WONG, *Assistant Examiner.*